(12) United States Patent
Chen et al.

(10) Patent No.: US 10,558,831 B1
(45) Date of Patent: Feb. 11, 2020

(54) METHOD AND APPARATUS FOR DECODING SPATIALLY RELATED INDICIA

(71) Applicant: Zebra Technologies Corporation, Lincolnshire, IL (US)

(72) Inventors: Dongqing Chen, East Setauket, NY (US); David S. Koch, East Islip, NY (US); Lindsay M. Fahmi, Shelton, CT (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/214,740

(22) Filed: Dec. 10, 2018

(51) Int. Cl.
*G06K 7/14* (2006.01)
*G06K 7/08* (2006.01)
*G06K 7/10* (2006.01)
*G06K 7/00* (2006.01)

(52) U.S. Cl.
CPC ......... *G06K 7/1413* (2013.01); *G06K 7/0047* (2013.01); *G06K 7/082* (2013.01); *G06K 7/1097* (2013.01); *G06K 7/1417* (2013.01); *G06K 2007/10485* (2013.01)

(58) Field of Classification Search
CPC .. G06K 7/1413; G06K 7/1417; G06K 7/0047; G06K 2007/10485
USPC .............................. 235/385, 462.08, 462.32
See application file for complete search history.

(56) References Cited

U.S. PATENT DOCUMENTS

| 7,392,951 | B2* | 7/2008 | Ray | G06K 7/10851 235/462.01 |
| 9,524,411 | B2 | 12/2016 | He | |
| 2006/0261167 | A1* | 11/2006 | Ray | G06K 7/10851 235/462.08 |
| 2009/0078774 | A1* | 3/2009 | He | G06K 7/10722 235/462.41 |
| 2013/0193211 | A1* | 8/2013 | Baqai | G06K 7/1413 235/462.04 |
| 2013/0341401 | A1* | 12/2013 | Kannan | G06K 7/10792 235/462.08 |
| 2015/0146925 | A1* | 5/2015 | Son | G06K 9/00624 382/103 |
| 2019/0018992 | A1* | 1/2019 | Bizoara | G06K 7/10722 |

OTHER PUBLICATIONS

SimulScan Product Spec Sheet, ZIH Corp (2018).

* cited by examiner

*Primary Examiner* — Paultep Savusdiphol

(57) ABSTRACT

A method of decoding spatially related indicia includes: at an imaging controller, controlling an image sensor to capture an image containing a plurality of indicia; at the imaging controller, detecting image positions of each of the indicia; at the imaging controller, for each of a plurality of indicia pairs: determining whether the image positions of the indicia in the pair have a predefined spatial relationship; and responsive to determining that the indicia in the pair have the predefined spatial relationship, presenting (i) values decoded from the indicia in the pair, and (ii) an indicator that the decoded values are related.

19 Claims, 9 Drawing Sheets

US 10,558,831 B1

METHOD AND APPARATUS FOR DECODING SPATIALLY RELATED INDICIA

BACKGROUND

Indicia such as barcodes are employed to identify and track items in a wide variety of use cases. For example, distinct barcodes may be employed to identify each of a plurality of items, such as units packed in a crate, pallet, or the like. The barcodes may be printed on a shipping manifest or the like. Further, more than one barcode may be provided on the manifest for each unit, e.g. with each barcode for a given unit specifying a different attribute of the unit. Such barcodes can be scanned in bulk by image-based scanners, but associating the barcodes that correspond to a given unit requires time-consuming and error-prone manual intervention.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
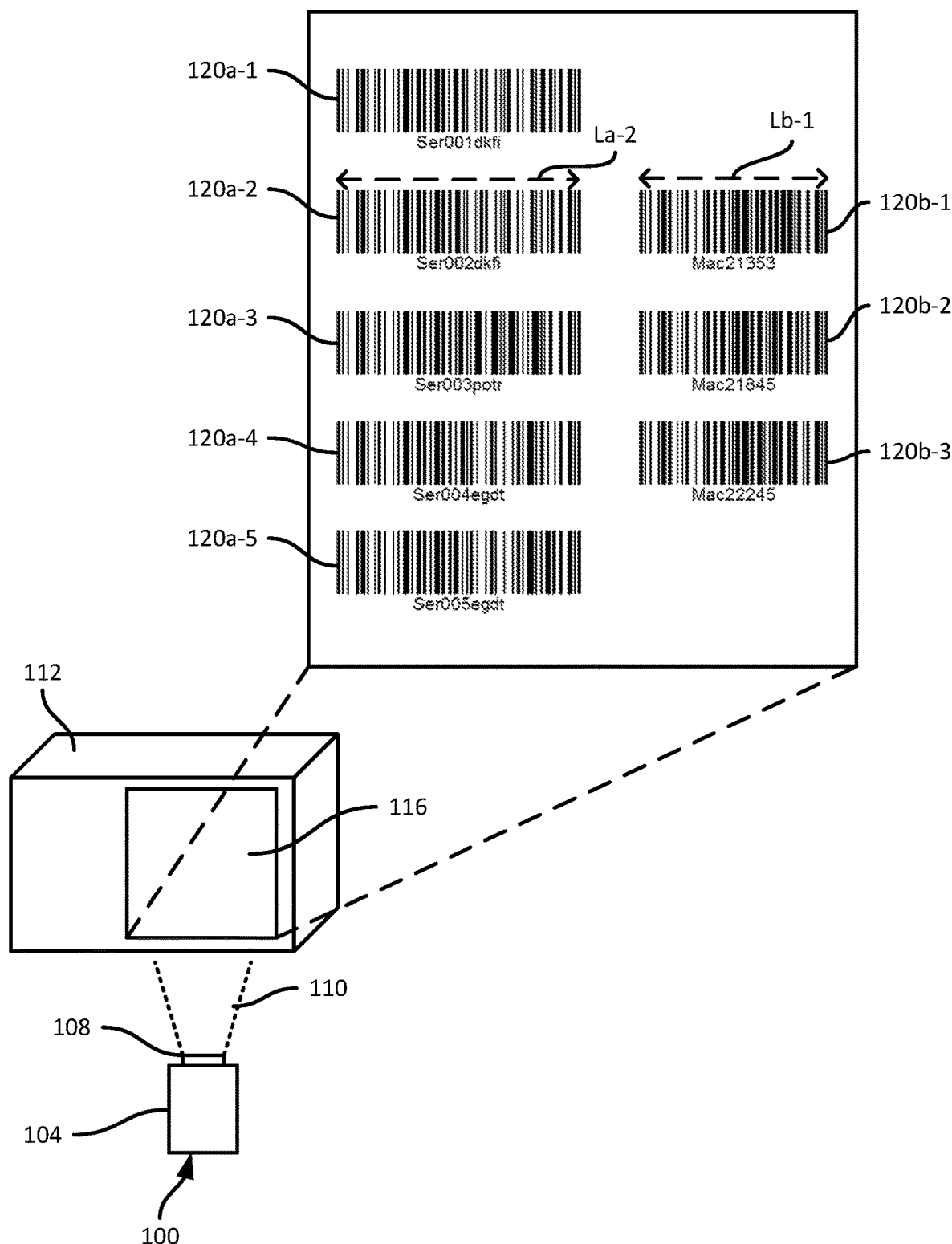
FIG. 1 is a schematic of a data capture device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method in a data capture device of decoding spatially related indicia, the method comprising: at an imaging controller, controlling an image sensor to capture an image containing a plurality of indicia; at the imaging controller, detecting image positions of each of the indicia; at the imaging controller, for each of a plurality of indicia pairs: determining whether the image positions of the indicia in the pair have a predefined spatial relationship; and responsive to determining that the indicia in the pair have the predefined spatial relationship, presenting (i) values decoded from the indicia in the pair, and (ii) an indicator that the decoded values are related.

Additional examples disclosed herein are directed to a data capture device, comprising: a data capture module having an image sensor; an imaging controller connected to the data capture module, the imaging controller configured to: control the image sensor to capture an image containing a plurality of indicia; detect image positions of each of the indicia; for each of a plurality of indicia pairs: determine whether the image positions of the indicia in the pair have a predefined spatial relationship; and responsive to determining that the indicia in the pair have the predefined spatial relationship, present (i) values decoded from the indicia in the pair, and (ii) an indicator that the decoded values are related.

Further examples disclosed herein are directed to a non-transitory computer readable medium storing computer-readable instructions executable by an imaging controller of a data capture device to: control an image sensor of the data capture device to capture an image containing a plurality of indicia; detect image positions of each of the indicia; for each of a plurality of indicia pairs: determine whether the image positions of the indicia in the pair have a predefined spatial relationship; and responsive to determining that the indicia in the pair have the predefined spatial relationship, present (i) values decoded from the indicia in the pair, and (ii) an indicator that the decoded values are related.

FIG. 1 depicts an example data capture device 100 in accordance with the teachings of this disclosure. The device 100 includes a housing 104 supporting the various other components discussed herein. In some examples, the housing 104 is a unitary structure supporting all other components of the device 100. In other examples, the housing 104 is implemented as two or more distinct (e.g. separable) housing components, such as a first component comprising a pistol-grip handle including a cradle configured to receive a second component comprising the housing of a smartphone, tablet computer, or the like.

The housing 104 supports a data capture module 108 configured to capture indicia within a field of view 110. The data capture module 108 includes any suitable combination of light emitters, reflectors and the like enabling the data capture module 108 to capture indicia. In the present example, the data capture module 108 is an imaging-based barcode scanner, and the data capture module 108 therefore includes one or more image sensors (e.g. a camera). Also depicted in FIG. 1 is an object 112 such as a box, pallet or the like, bearing a plurality of indicia. In the present example, the indicia are displayed on a sheet 116 affixed to the object 112, and include indicia of two types. Specifically, the sheet 116 contains five example indicia 120*a*-1, 120*a*-2, 120*a*-3, 120*a*-4 and 120*a*-5 of a first type, and three example indicia 120*b*-1, 120*b*-2, and 120*b*-3 of a second type. In other examples, the indicia 120 need not be displayed on the sheet 116, but can instead be displayed directly on the object 112, on a plurality of sheets or other objects, or the like.

The type of each indicium can be defined by a suitable one of, or a suitable combination of, a symbology of the indicium and an attribute of data encoded by the indicium. In the present example, the indicia of the first type employ the Code-128 symbology, and encode serial numbers, as indicated by the characters "Ser" beginning each encoded value. The indicia of the second type also employ the Code-128 symbology, and encode media access control (MAC) addresses, as indicated by the characters "Mac" beginning each encoded value. For example, the indicia 120 and 124 may correspond to units of networking equipment (e.g. routers) contained with the object 112. A wide variety of other types of indicia may also be employed, as will now be apparent to those skilled in the art. For example, in other embodiments, some or all of the indicia 120 can employ two-dimensional symbologies (e.g. PDF417) instead of the one-dimensional Code-128 symbology shown in FIG. 1. Further, any of a wide variety of data encoded in the indicia 120 can be employed to distinguish between the types.

As seen in FIG. 1, certain indicia 120 on the sheet 116 are related, in that they encode data corresponding to the same object. For example, the indicia 120*a*-2 and 120*b*-1 encode a serial number and MAC address, respectively, for a single router within the object 112. Similarly, the indicia 120*a*-3 and 120*b*-2 encode a serial number and MAC address for another router, while the indicia 120*a*-4 and 120*b*-3 encode a serial number and MAC address for yet another router. The indicia 120*a*-1 and 120*a*-5 encode serial numbers for two additional items that do not have MAC addresses (e.g. lengths of cable included with the routers mentioned above).

As will be discussed in greater detail below, the device 100 is configured to capture and decode the indicia 120, and to detect whether any of the indicia 120 are related (e.g. correspond to the same physical item, such as the above-mentioned routers) based on the types of the indicia and on the relative spatial orientation of the indicia 120 on the sheet 116. For example, the device 100 can be configured to detect that the indicia 120*a*-2 and 120*b*-1 are related by detecting that the indicia 120*a*-2 and 120*b*-1 are horizontally aligned (i.e. that lengths La-2 and Lb-1 of the indicia 120*a*-2 and 120*b*-1 are collinear). The device 100 is further configured to present the results of a scan session indicating any such relationships detected between captured indicia 120.

Figure 2:
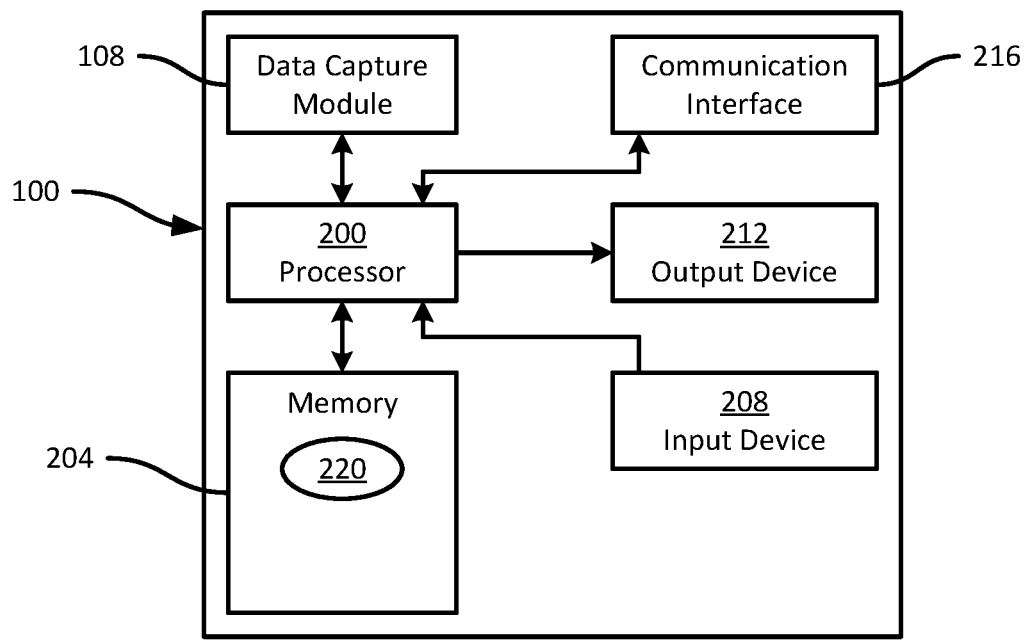
FIG. 2 is a block diagram of certain internal components of the data capture device of FIG. 1.

Turning to FIG. 2, a schematic diagram of certain internal components of the device 100 is shown. The device 100 includes a central processing unit (CPU), also referred to as a processor 200, interconnected with a non-transitory computer readable storage medium, such as a memory 204. The memory 204 includes any suitable combination of volatile memory (e.g. Random Access Memory ("RAM")) and non-volatile memory (e.g. read only memory ("ROM"), Electrically Erasable Programmable Read Only Memory ("EE-PROM"), flash memory). In general, the processor 200 and the memory 204 each comprise one or more integrated circuits.

The data capture device 100 also includes at least one input device 208 interconnected with the processor 200. As will be apparent to those skilled in the art, the input device 208 is configured to receive input and provide data representative of the received input to the processor 200. In the present example, the input device 208 includes a trigger supported by the housing 104, in response to the actuation of which the processor 200 controls the data capture module 108 to initiate a capture session for capturing the indicia 120. The input device 208 can also include a touch screen, a microphone, a keypad, and the like.

The device 100 also includes at least one output device 212 interconnected with the processor 200. The output device 212, in the present example, includes a display supported by the housing 104. The display can be a flat-panel display, such as an organic light-emitted diode-based display (e.g. an active-matrix OLED, or AMOLED, display). In other examples, however, the display can be implemented with any of a wide variety of display technologies. In other examples (not shown), the output device 212 also includes any one of, or any suitable combination of, a speaker, a notification LED, and the like.

The device 100 also includes a communication interface 216 interconnected with the processor 200. The communication interface 216 includes any suitable hardware (e.g. transmitters, receivers, network interface controllers and the like) allowing the device 100 to communicate with other computing devices via a link with a network or with the other computing devices themselves. The specific components of the communication interface 216 are selected based on the type of network or other links that the device 100 is required to communicate over. Examples of such networks and/or links include those based on the Bluetooth™ standard, the IEE 802.11 family of standards, wired links (e.g. Ethernet), mobile networks and the like.

The various components of the device 100 are interconnected, for example via one or more communication buses. The device 100 also includes a power source for supplying the above-mentioned components with electrical power. In the present example, the power source includes a battery; in other examples, the power source includes a wired connection to a wall outlet or other external power source in addition to or instead of the battery.

The memory 204 stores a plurality of applications, each including a plurality of computer readable instructions executable by the processor 200. The execution of the above-mentioned instructions by the processor 200 causes the device 100 to implement certain functionality discussed herein. Each application is therefore said to be configured to perform that functionality in the discussion below.

In the present example, the memory 204 stores a capture control application 220, also referred to herein as the application 220. The device 100 is configured, via execution of the application 220 by the processor 200, to initiate and terminate capture sessions and, during such capture sessions, to capture indicia such as the indicia 120 shown in FIG. 1 and detect spatial relationships therebetween. The processor 200, as configured via the execution of the application 220, may also be referred to as an imaging controller. In other examples, some or all of the functionality described below is implemented by the data capture module 108 itself (e.g. by a microcontroller incorporated in the data capture module 108) rather than at the processor 200. The data capture module 108 itself may implemented the above-mentioned imaging controller, in other words. In further examples, the functionality described herein is implemented as one or more specifically-configured hardware elements, such as field-programmable gate arrays (FPGAs) and/or application-specific integrated circuits (ASICs), in addition to or instead of the data capture module 108 and the processor 200.

Figure 3:
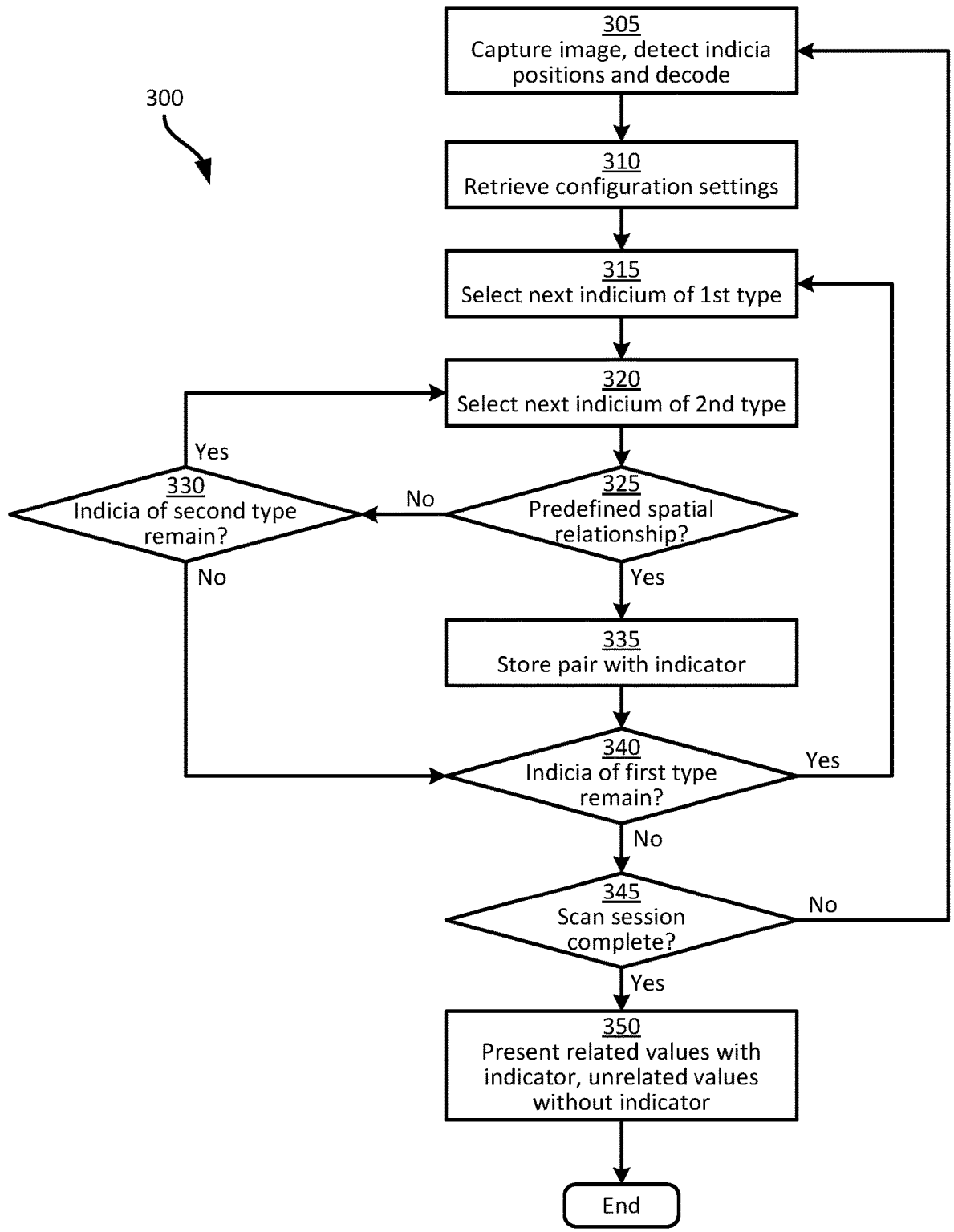
FIG. 3 is a flowchart of a method for decoding spatially related indicia.

Turning to FIG. 3, a method 300 of decoding spatially related indicia is depicted. The method 300 will be described in conjunction with its performance by the device 100, with reference to the components of the device 100 as illustrated in FIG. 2.

At block 305, the data capture device 100 is configured to capture an image containing a plurality of indicia. In the present example, the device 100 is assumed to capture an image depicting the entirety of the sheet 116 shown in FIG. 1. The performance of block 305 can be initiated, for example, in response to actuation of the input device 108 (e.g. the above-mentioned trigger).

Figure 4A:
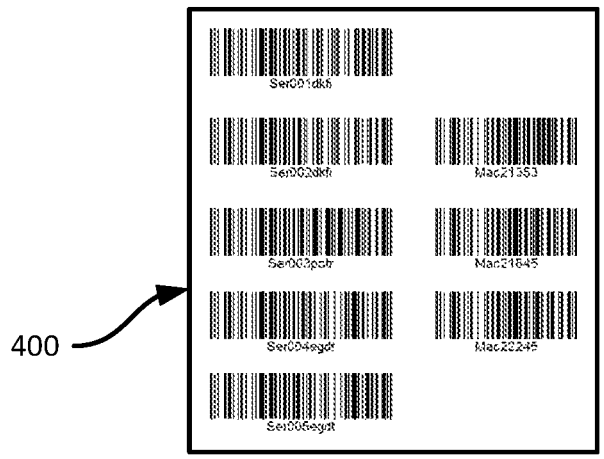
FIG. 4A is a diagram illustrating an image captured by the data capture device of FIG. 1 during the performance of the method of FIG. 3.
Figure 4B:
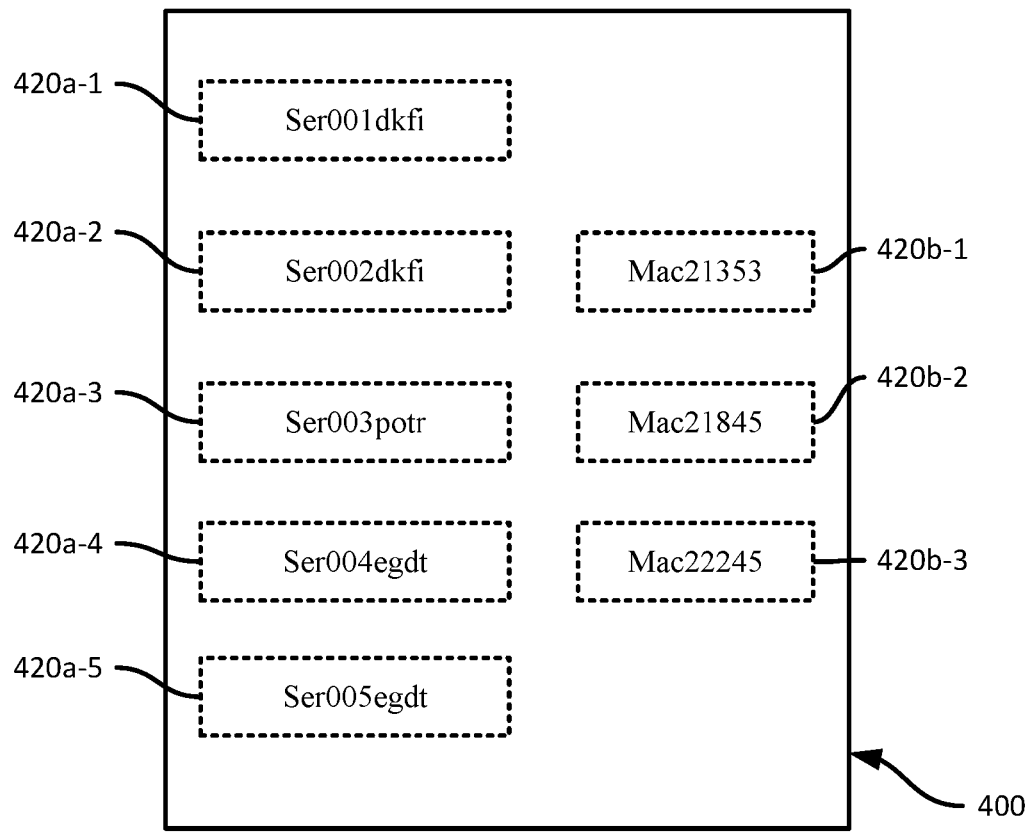
FIG. 4B is a diagram illustrating bounding boxes derived from the image of FIG. 4A.

Having captured the image, the device 100 is configured to detect positions of the indicia 120 in the image, and to decode the indicia (i.e. to extract decoded values from each indicium 120). Turning to FIG. 4A, an image 400 depicting the sheet 116 is shown as captured at block 305. The image 400 is shown in FIG. 4B omitting the indicia 120 themselves for clarity of illustration, and showing instead the positions of each indicium, as detected by the device 100. The positions of the indicia 120 are detected as bounding boxes 420 with numerals corresponding to those shown in FIG. 1. Thus, the bounding boxes 420a-1 through 420a-5 correspond to the indicia 120a-1 through 120a-5 respectively, and the bounding boxes 420b-1 through 420b-3 correspond to the indicia 120b-1 through 120b-3 respectively. The bounding boxes 420 are shown graphically in FIG. 4B, but need not be stored graphically in the device 100. For example, each bounding box 420 can be stored as a set of four pairs of pixel coordinates defining the position of a vertex of the bounding box 420.

The device 100 is also configured, as noted above, to decode the indicia contained in the image captured at block 305. Thus, as shown in FIG. 4, a decoded value is shown in association with each bounding box 420 (e.g. the value "Ser001dkfi" in association with the bounding box 420a-1).

In general, following the performance of block 305, the device 100 is configured to assess each of a plurality of pairs of the indicia detected and decoded at block 305, to determine whether each pair has a predefined spatial relationship. In the present example, pairs of indicia are selected based on configuration settings defining code types and associations therebetween.

Returning to FIG. 3, at block 310 the processor 200 is configured to retrieve configuration settings associated with the application 220. The configuration settings define types of indicia, as well as associations between the types of indicia. Table 1, below, illustrates an example set of configuration settings.

TABLE 1

Example Configuration Settings

| Name | Symbology | String | Related |
|---|---|---|---|
| Serial | Code-128 | Ser | MAC |
| MAC | Code-128 | Mac | |

As seen above, the configuration settings of Table 1 define two types of indicia, the first ("Serial") corresponding to the indicia 120a, and the second ("MAC") corresponding to the indicia 120b. In addition to defining a symbology for each type and a string of characters encoded in the indicia of each type, the configuration settings also indicate, for at least one type, a related type. Thus, in the example above the configuration settings indicate that the "Serial" type is related to the "MAC" type. In some examples, the MAC type may also include an indication that it is related to the Serial type. However, as will be apparent in the discussion below, the configuration settings need only indicate an identifier of a related type in connection with one of a pair of indicia types that are related.

At block 315, the device 100 is configured to select the next indicium 120 of a first type indicated in the configuration settings. The "first" type, as referred to herein, is a type of indicium for which the configuration settings includes a related indicium type. Thus, in the present example, at block 315 the device 100 is configured to select one of the indicia 120a. Any one of the indicia 120a can be selected at block 315. For illustrative purposes, in the present example performance of block 315 the indicium 120a-1 (encoding the value "Ser001dkfi") is selected at block 315.

At block 320 the device 100 is configured to select the next indicium 120 of a second type. The second type is the type identified as being related to the first type in the configuration settings. Therefore, in the present example, at block 315 the device 100 is configured to select one of the indicia 120b, corresponding to the MAC type indicated in the configuration settings as being related to the Serial type. For illustrative purposes, it is assumed that the device 100 selects the indicium 120b-1 at block 320.

The indicia selected at blocks 315 and 320 form a pair of indicia, and the device 100 is then configured, at block 325, to determined whether the selected pair of indicia 120 have a predefined spatial relationship. That is, the device 100 is configured to determine whether the indicia 120 in the pair have a predefined position relative to each other, as indicated by the bounding boxes 420.

Any one or more predefined spatial relationships can be evaluated at block 325. In the present example, the device 100 is configured to determine whether the pair of indicia selected at block 315 and 320 are aligned such that their lengths are collinear. That is, with the sheet 116 in the orientation shown in FIGS. 1 and 4, the device 100 is configured to determine whether the pair of indicia are aligned horizontally. As noted earlier, indicia 120 that are aligned horizontally have lengths (e.g. the lengths La-2 and Lb-1 shown in FIG. 1, measured along upper edges of the indicia 120a-2 and 120b-1, respectively) that are substantially collinear. In other words, the indicia 120 appear at substantially the same position along the length of the sheet 116, and at different positions across the width of the sheet 116.

Figure 5A:
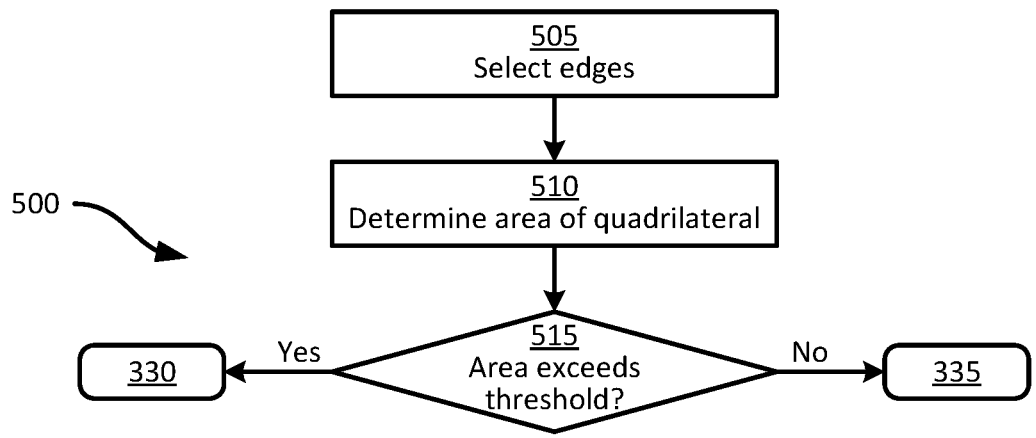
FIG. 5A is a flowchart of a method for performing block 325 of the method of FIG. 3.
Figure 5B:
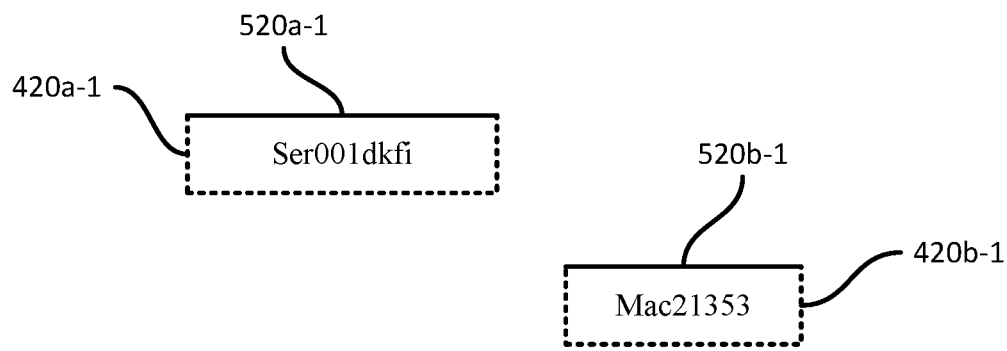
FIGS. 5B and 5C are diagrams illustrating a performance of the method of FIG. 5A.

Various mechanisms for performing the determination at block 325 are contemplated. In the present example performance of the method 300, the determination at block 325 is performed by determining the area of a quadrilateral with two opposing sides defined by respective edges of the indicia 120 selected at blocks 315 and 320. Specifically, turning to FIG. 5, a method 500 of determining whether the pair of indicia have the predefined spatial relationship is shown. At block 505, the device 100 is configured to select one edge of each of the indicia 120 in the pair being evaluated. In the present example, as shown in FIG. 5B, the upper edges 520a-1 and 520b-1 of the bounding boxes 420a-1 and 420b-1 are selected.

Figure 5C:
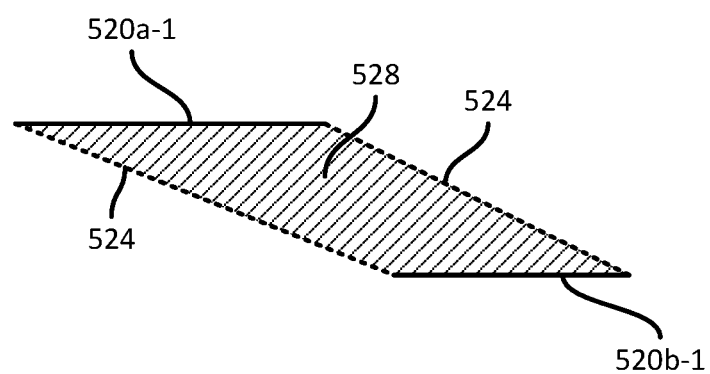

At block 510, the device 100 is configured to determine the area of a quadrilateral defined by the edges selected at block 505. In particular, as shown in FIG. 5C, the device 100 is configured to generate segments 524 connecting the ends of the edges 520, such that the segments 524 along with the edges 520 complete a quadrilateral 528. The device 100 is configured to determine the internal area of the quadrilateral 528 (i.e. the shaded area in FIG. 5C). At block 515, the device 100 is configured to determine whether the area determined at block 510 exceeds a predefined threshold.

The upper edges of horizontally-aligned indicia 120 define a quadrilateral with an area that is zero, or substantially zero, because the upper edges are collinear. Thus, the threshold at block 515 is set within a predefined tolerance of zero. The area may be specified, for example, as a number of square pixels, as a percentage of the pixel area of the image 400, as a percentage of the area of the bounding boxes 420, or the like. In the present example, the threshold at block 515 is defined as a fraction (e.g. 10%) of the combined area of the bounding boxes 420 corresponding to the indicia selected at blocks 315 and 320. As seen in FIG. 5C, the area of the quadrilateral 528 exceeds 10% of the combined areas of the bounding boxes 420a-1 and 420b-1 shown in FIG. 5B. The determination at block 515 is therefore affirmative, and the device 100 proceeds to block 330. That is, the determination at block 325 is negative.

Following a negative determination at block 325, the device 100 proceeds to block 330, and determines whether any indicia 120 of the second type remain to be processed. In the present example, the determination is affirmative, because the indicia 120b-2 and 120b-3 have not be processed. Returning therefore to block 320, the device 100 is configured to select a new pair of indicia, including the indicium 120a-1 (i.e. the same indicium 120 of the first type) and the indicium 120b-2.

Figure 6A:
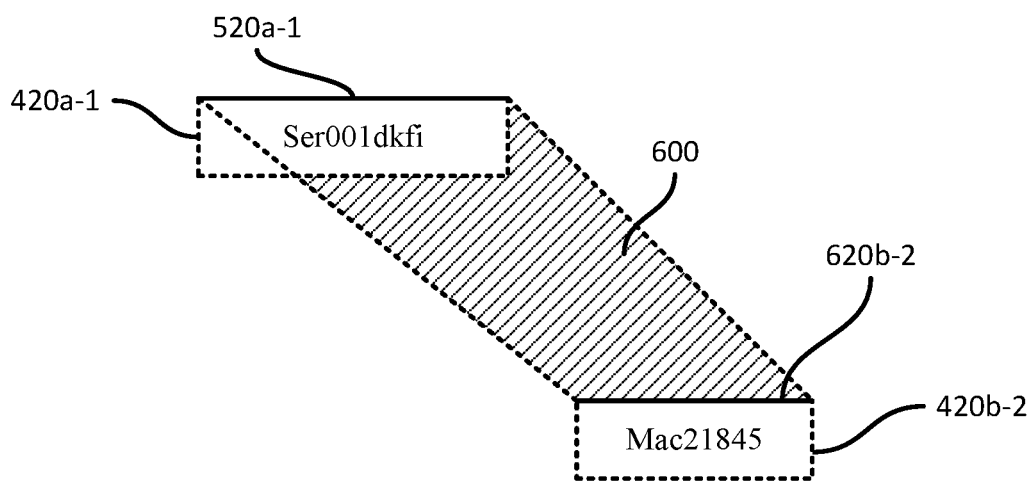
FIGS. 6A, 6B and 6C are diagrams illustrating further performances of the method of FIG. 5A.
Figure 6B:
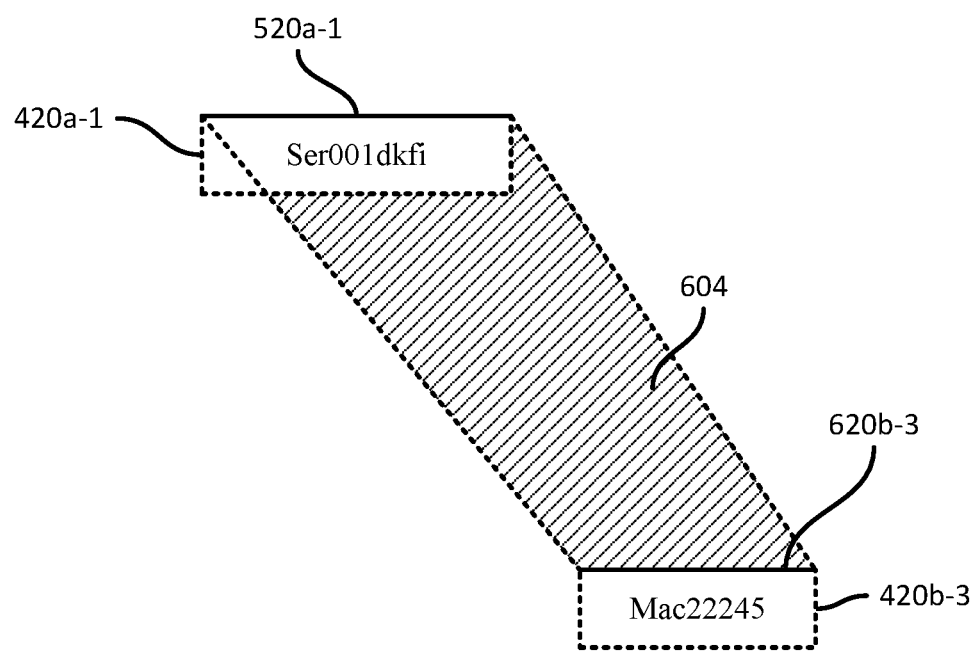

The device 100 is then configured to repeat block 325 for the current pair. As will now be apparent, the determination at block 325 is negative for both the pair including the indicia 120a-1 and 120b-2, and the pair including the indicia 120a-1 and 120b-3. FIG. 6A illustrates a quadrilateral 600 formed by the edges 520a-1 and 620b-2 of the bounding boxes 420a-1 and 420b-2. As is evident from FIG. 6A, the area of the quadrilateral 600 exceeds the above-mentioned threshold of 10% of the combined area of the bounding boxes 420a-1 and 420b-2. FIG. 6B illustrates a quadrilateral 604 formed by the edges 520a-1 and 620b-3 of the bounding boxes 420a-1 and 420b-3. The area of the quadrilateral 604, as with the quadrilateral 600, exceeds the above-mentioned threshold.

Returning to FIG. 3, following the evaluation of the pairs of bounding boxes 420 shown in FIGS. 6A and 6B, the device 100 is configured to perform a further instance of block 330. At the further performance of block 330, the determination is negative, as no further indicia 120 of the second type (i.e. the MAC type, in this example) remain to be processed. Responsive to a negative determination at block 330, the device 100 proceeds to block 340.

At block 340, the device 100 is configured to determine whether indicia 120 of the first type (i.e. the Serial type, in the present example) remain to be processed. In the present example performance of the method 300, the determination at block 340 is affirmative, as the indicia 120a-2 through 120a-5 have not been processed. The device 100 therefore returns to block 315 and selects the next indicium 120 of the first type. For example, the device 100 may select the indicium 120a-2 at block 315. At block 320, the next indicium 120 of the second type is selected (e.g. the indicium 120b-1). In other words, the device 100 is configured to cycle through the indicia 120 of the second type for each of the indicia 120 of the first type.

Figure 6C:
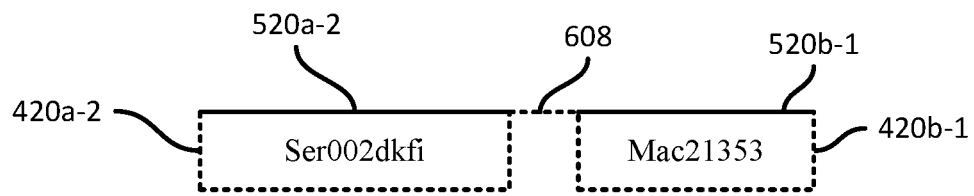

The performance of block 325 is then repeated for the current pair of indicia 120 selected at blocks 315 and 320. FIG. 6C illustrates the performance of block 325 for the indicia 120a-2 and 120b-1. As seen in FIG. 6C, a quadrilateral 608 formed by the edges 520a-2 and 520b-1 of the bounding boxes 420a-2 and 420b-1, respectively, is substantially one-dimensional because the edges 520a-2 and 520b-1 are substantially collinear. Therefore, the area of the quadrilateral is substantially equal to zero, below the above-mentioned threshold. Returning to FIG. 3, the determination at block 325 is therefore affirmative.

Responsive to an affirmative determination at block 325, at block 335 the device 100 is configured to store the values decoded from the pair of indicia 120 selected at blocks 315 and 320 with an indicator that the values are related. A wide variety of indicators are contemplated. For example, the indicator can include a data field associated with at least one of the related decoded values, containing a reference to the other of the related decoded values. The reference can include a storage location of the other decoded value, or the other decoded value itself. In further examples, the decoded values can be stored in a repository in the memory 204 that defines pairs of associated fields. Thus, the storage of the indicia in one pair of the above-mentioned fields, rather than in separate pairs (with the other member of the pair being empty), serves as the indicator at block 335.

Following the performance of block 335, the device 100 proceeds to block 340, and the above process is repeated until all the indicia 120 have been processed. Following processing of all the indicia 120 captured at block 305, a value decoded from each indicium is stored in the memory 204, with or without an indicator that it is related to another indicium, according to the determination(s) at block 325 for pairs containing that value. When the determination at block 340 is negative, indicating that all indicia 120 captured at block 305 have been processed and either paired with related indicia or remained unpaired through one or more negative determinations at block 325, the device 100 proceeds to block 345.

At block 345 the device 100 is configured to proceed to block 345 and determine whether the scan session is complete. In some examples, the determination at block 345 is the same as the determination at block 340. That is, when no indicia of the first type remain to be processed, the scan session is automatically terminated. Block 345, in other words, can be omitted in such embodiments. In other embodiments, the device 100 operates in a multi-frame capture mode, in which more than one image can be captured at block 305 during a single scan session. Such a mode can be employed when the sheet 116 cannot be captured in a single image, e.g. due to its physical size.

Figure 7:
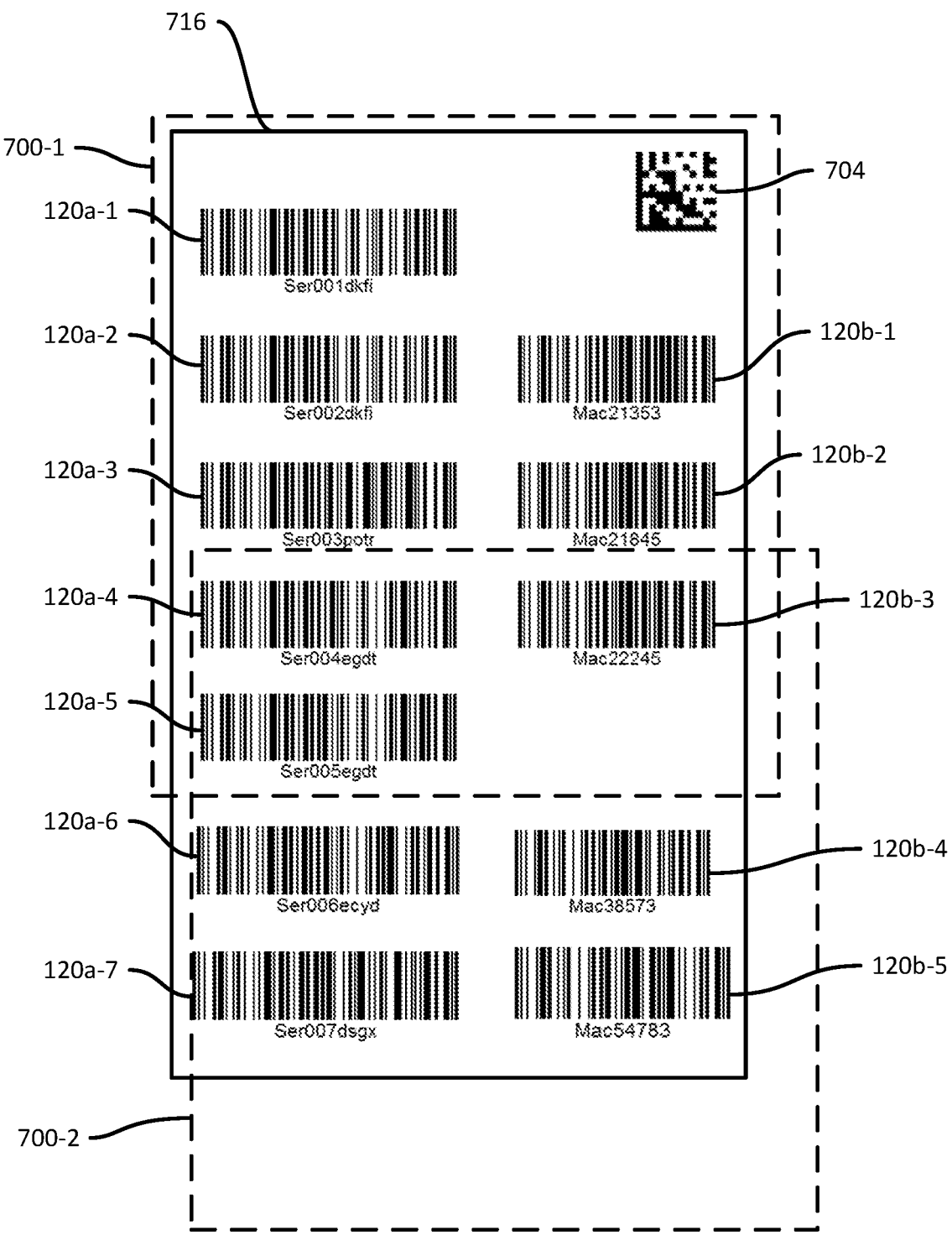
FIG. 7 is a diagram illustrating a sequence of images captured during the performance of the method of FIG. 3.

Turning to FIG. 7, an example sheet 716 is shown bearing the indicia 120a-1 through 120a-5 and 120b-1 through 120b-3 as discussed above, as well as additional indicia 120a-6, 120a-7 and 120b-4 and 120b-5. The sheet 716 is too large to capture in a single image, and the device 100 is therefore configured to capture a plurality of images (e.g. as the field of view 108 is swept over the sheet 716). In particular, two images 700-1 and 700-2 are illustrated, encompassing overlapping portions of the sheet 716. Each image 700 is processed via the performance of blocks 310-340. The device 100 can also be configured, responsive to capturing an image at block 305, to decode the indicia therein, but to retain for further processing only those that have not previously been processed via blocks 315-340, so as to avoid generating duplicate output.

The sheet 716 also includes an indicium 704 encoding a quantity (e.g. a Data Matrix barcode in the present example). The quantity encoded by the indicium 704 specifies the number of items in the object 112, which corresponds to the expected number of Serial-type indicia 120 (i.e. the indicia 120a). The determination at block 345 in such embodiments can include a determination as to whether the number of indicia 120a decoded and processed matches the number encoded in the quantity indicium 704. When the determination at block 345 is negative, the device 100 is configured to return to block 305 (e.g. to capture another image). When the determination at block 345 is affirmative, the device 100 proceeds to block 350.

At block 350, the device 100 is configured to present the values decoded from the indicia 120. Presenting the decoded values can include any one of, or any combination of, controlling the output device 212 to present the values (e.g. to render the values on a display), transmitting the values to another computing device, or the like. The values decoded from pairs of related indicia 120 (i.e. pairs of indicia 120 for which the determination at block 325 is affirmative) are presented with an indication that they are related. Values decoded from indicia 120 for which no affirmative determination at block 325 was made are presented without such an indicator.

Figure 8:
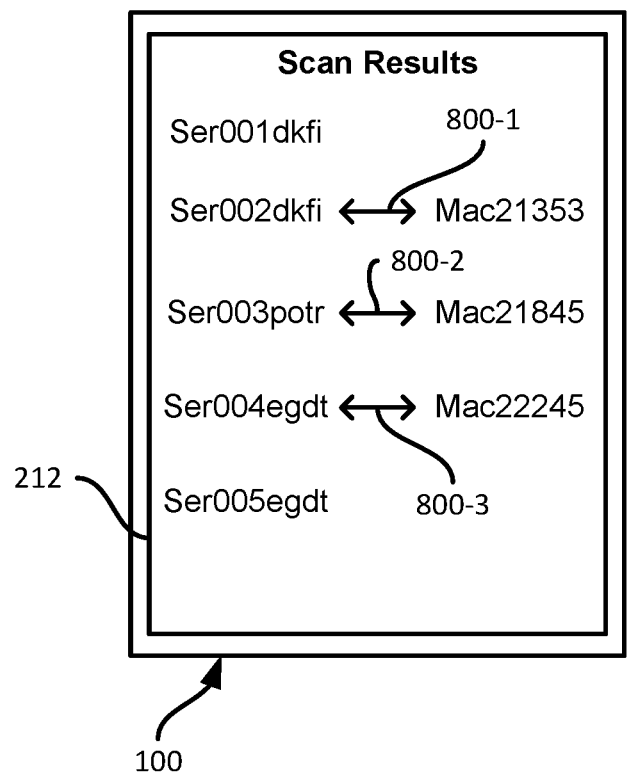
FIG. 8 is a diagram illustrating a performance of block 350 of the method of FIG. 3.

FIG. 8 illustrates the device 100 following the performance of block 350, in which the output device 212 (a display, in the present example) is controlled by the processor 200 to present the values decoded from the indicia 120, including graphical indicators 800-1, 800-2, 800-3, indicating that certain pairs of values are related. The remaining values (corresponding to the indicia 120a-1 and 120a-5) are shown without such indicators.

Figure 9A:
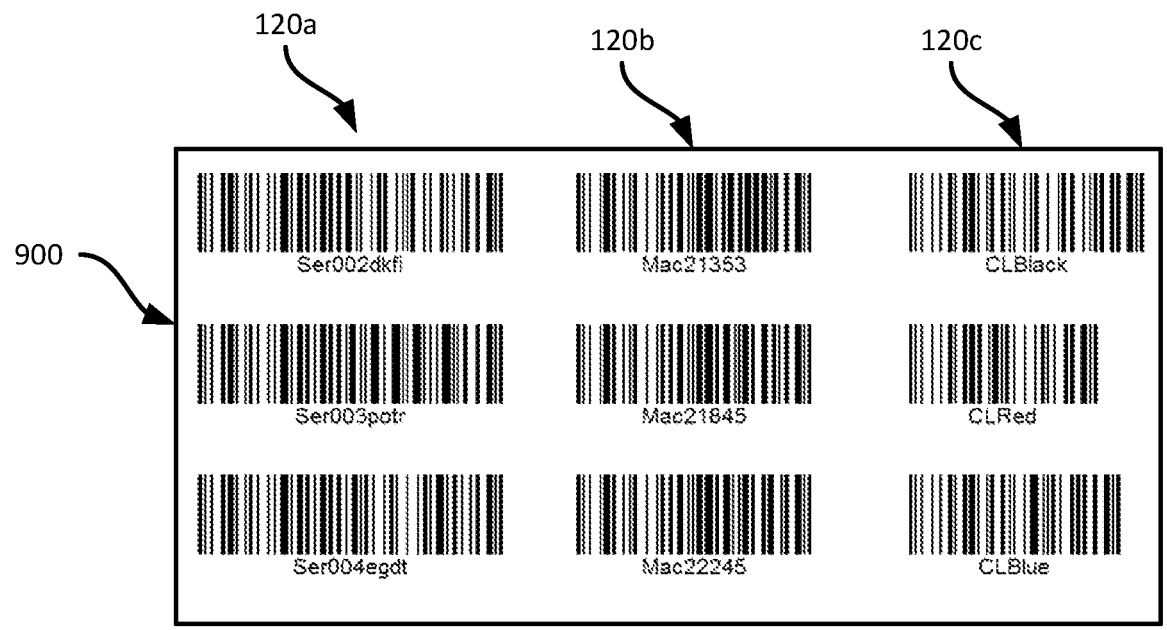
FIG. 9A is a diagram illustrating a further image captured by the data capture device of FIG. 1 during the performance of the method of FIG. 3.

Variations to the above device and method are contemplated. For example, the performance of the method 300 can be extended to detect spatial relationships between more than two types of indicia. Turning to FIG. 9A, a sheet 900 bearing three types of indicia 120a, 120b (as discussed above) and 120c is illustrated. The indicia 120c encode colors for the routers or other equipment corresponding to the serial numbers and MAC addresses encoded by the indicia 120a and 120b, respectively. Thus, the string "CLBlack" indicates the color of a router having the serial number string "Ser002dkfi" and the MAC address string "Mac21353".

Table 2, below, illustrates example configuration settings for use in decoding the indicia of the sheet 900.

TABLE 2

Example Configuration Settings

| Name | Symbology | String | Related |
|---|---|---|---|
| Serial | Code-128 | Ser | MAC; Color |
| MAC | Code-128 | Mac | |
| Color | Code-128 | CL | |

Figure 9B:
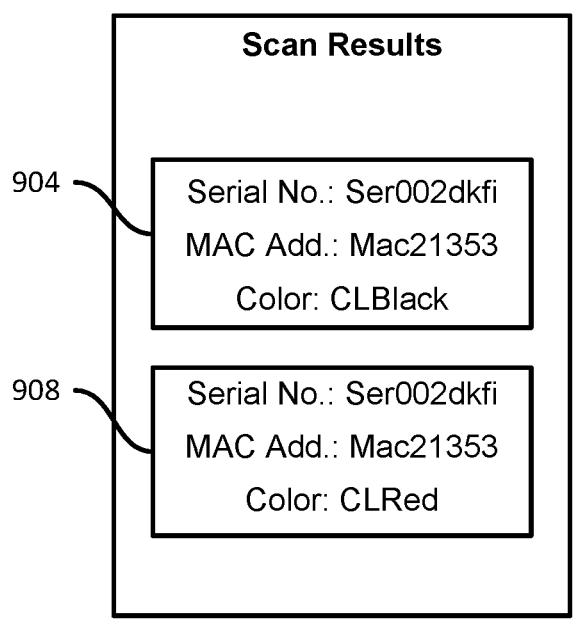
FIG. 9B a diagram illustrating a performance of block 350 of the method of FIG. 3 following processing of the image of FIG. 9A.

As seen above, the configuration settings indicate that the serial number type is related to both the MAC address and color types. Thus, for example, the device 100 can be configured to perform blocks 320-335 for each Serial-type indicium to determine whether a related MAC-type indicium exists. Before proceeding to the next Serial-type indicium, however, the device 100 is configured to repeat blocks 320-335 for the third type (Color, in the present example). FIG. 9B illustrates an example partial presentation of decoded values from the sheet 900, including graphical indicators 904, 908 indicating triplets of related values.

In further variations, the device 100 can be configured to evaluate a plurality of distinct spatial relationships at block 325, in addition to or instead of the horizontal alignment discussed above. For example, the device 100 can be configured to detect vertical alignment (i.e. that the heights of two or more indicia 120 are collinear) of indicia by selecting left or right edges of the indicia and generate a quadrilateral therefrom, as discussed in connection with the method 500. The device 100 can be further configured to apply additional thresholds at block 325, such as a distance threshold. For example, the device 100 can be configured to determine the centroid of each bounding box 420, and to determine a distance between the centroids of the bounding boxes 420 of the indicia selected at blocks 315 and 320. The determination at block 325 can be affirmative only when the alignment criteria (e.g. the area of the quadrilateral as discussed above) is satisfied and when the distance is below a predetermined threshold indicating that the pair of indicia are adjacent to each other.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method in a data capture device of decoding spatially related indicia, the method comprising:
   at an imaging controller, controlling an image sensor to capture an image containing a plurality of indicia;
   at the imaging controller, detecting image positions of each of the indicia;
   at the imaging controller, for each of a plurality of indicia pairs:
      determining whether the image positions of the indicia in the pair have a predefined spatial relationship; and
      responsive to determining that the indicia in the pair have the predefined spatial relationship, presenting (i) values decoded from the indicia in the pair, and (ii) an indicator that the decoded values are related.

2. The method of claim 1, further comprising:
   at the imaging controller, responsive to determining that an indicium does not have the predefined spatial relationship presenting a value decoded from the indicium without the indicator.

3. The method of claim 1, wherein presenting the values and the indicator includes controlling a display of the data capture device to render the values and the indicator.

4. The method of claim 1, wherein the image positions include bounding boxes.

5. The method of claim 4, wherein determining whether the image positions of the indicia in the pair have the predefined spatial relationship includes:
   at the imaging controller, selecting a predefined edge of each bounding box of the pair of indicia; and
   determining whether the edges are substantially collinear.

6. The method of claim 5, wherein determining whether the edges are substantially collinear includes:
   at the imaging controller, joining the edges to generate a quadrilateral;
   determining a surface area of the quadrilateral; and
   determining whether the surface area of the quadrilateral exceeds a threshold, wherein a surface area exceeding the threshold indicates that the edges are not collinear.

7. The method of claim 1, wherein each indicia has a length and a height; and
   wherein the spatial relationship is at least one of (i) the lengths of the pair of indicia being substantially collinear, and (ii) the height of the pair of indicia being substantially collinear.

8. The method of claim 1, further comprising selecting the indicia pairs at the imaging controller by:
   retrieving a configuration setting defining first and second types of indicia;
   decoding the indicia to obtain the decoded values;
   selecting a primary indicium having a decoded value matching the first type; and
   selecting, for each pair, respective secondary indicia having decoded values matching the second type.

9. The method of claim 8, wherein the types of indicia include predefined character strings.

10. A data capture device, comprising:
    a data capture module having an image sensor;
    an imaging controller connected to the data capture module, the imaging controller configured to:
    control the image sensor to capture an image containing a plurality of indicia;
    detect image positions of each of the indicia;
    for each of a plurality of indicia pairs:
       determine whether the image positions of the indicia in the pair have a predefined spatial relationship; and
       responsive to determining that the indicia in the pair have the predefined spatial relationship, present (i) values decoded from the indicia in the pair, and (ii) an indicator that the decoded values are related.

11. The data capture device of claim 10, wherein the imaging controller is further configured to:
    responsive to determining that an indicium does not have the predefined spatial relationship, present a value decoded from the indicium without the indicator.

12. The data capture device of claim 10, further comprising a display;
    wherein the imaging controller is further configured, to present the values and the indicator, to control the display to render the values and the indicator.

13. The data capture device of claim 10, wherein the image positions include bounding boxes.

14. The data capture device of claim 13, wherein the imaging controller is further configured, to determine whether the image positions of the indicia in the pair have the predefined spatial relationship, to:
    select a predefined edge of each bounding box of the pair of indicia; and
    determine whether the edges are substantially collinear.

15. The data capture device of claim 14, wherein the imaging controller is further configured, to determine whether the edges are substantially collinear, to:
    join the edges to generate a quadrilateral;
    determine a surface area of the quadrilateral; and determine whether the surface area of the quadrilateral exceeds a threshold, wherein a surface area exceeding the threshold indicates that the edges are not collinear.

16. The data capture device of claim 10, wherein each indicia has a length and a height; and wherein the spatial relationship is at least one of (i) the lengths of the pair of indicia being substantially collinear, and (ii) the height of the pair of indicia being substantially collinear.

17. The data capture device of claim 10, wherein the imaging controller is further configured, to select the indicia pairs, to:

retrieve a configuration setting defining first and second types of indicia;

decode the indicia to obtain the decoded values;

select a primary indicium having a decoded value matching the first type; and select, for each pair, respective secondary indicia having decoded values matching the second type.

18. The data capture device of claim 17, wherein the types of indicia include predefined character strings.

19. A non-transitory computer readable medium storing computer-readable instructions executable by an imaging controller of a data capture device to:

control an image sensor of the data capture device to capture an image containing a plurality of indicia;

detect image positions of each of the indicia;

for each of a plurality of indicia pairs:

determine whether the image positions of the indicia in the pair have a predefined spatial relationship; and responsive to determining that the indicia in the pair have the predefined spatial relationship, present (i) values decoded from the indicia in the pair, and (ii) an indicator that the decoded values are related.

* * * * *